July 2, 1968 D. J. HINKEIN ET AL 3,391,300
SKEW CORRECTED DEFLECTION CIRCUIT
Filed Oct. 28, 1965
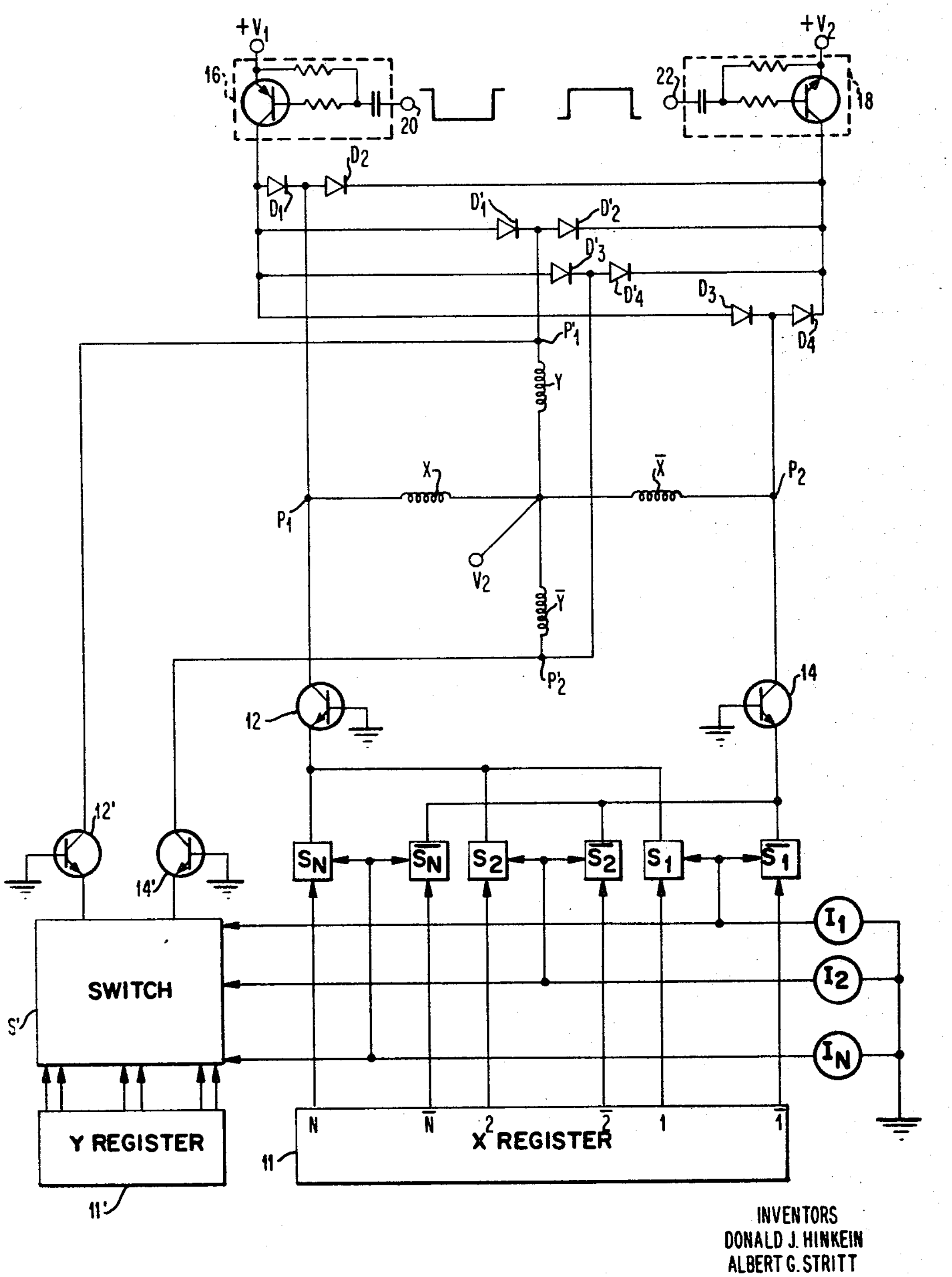
INVENTORS
DONALD J. HINKEIN
ALBERT G. STRITT
BY John B Frisone
ATTORNEY United States Patent Office 3,391,300

Patented July 2, 1968

3,391,300

SKEW CORRECTED DEFLECTION CIRCUIT

Donald J. Hinkein, Germantown, and Albert G. Stritt, Hyde Park, N.Y., assignors to International Business Machines Corporation, Armonk, N.Y., a corporation of New York Filed Oct. 28, 1965, Ser. No. 505,534
4 Claims. (Cl. 315—18)

This invention relates to graphic displays generally and more particularly to graphic displays employing cathode ray display tubes in which beam deflections are obtained by applying step currents to the tube deflection circuits.

The application of step currents for producing beam deflections is particularly suited to digital computer controlled graphic displays since the computer supplies a digital signal defining the line to be displayed by deflecting the beam. These signals are generally binary coded signals and are quite suitable for switching current sources which may be summed to provide step currents for producing the desired deflection.

The step current may be supplied to the yoke windings through separate sets of switches each of which is controlled by one binary bit position and provides a binarily weighted current. The current sources may be switched by transistors, under the control of the binary signal supplied, and operated thereby in a cut-off to saturation mode. Such an arrangement, however, presents a problem since the switching times for the transistors, due to the binarily weighted currents being switched, varies and the current in the yoke windings during switching will vary unpredictably, causing the beam to move or skew from its last attained position, thus distorting the desired image.

One object of this invention is to prevent image skewing in display systems employing step current deflection circuits during the time currents are changed to new values.

Another object of this invention is to provide a corrected deflection circuit for maintaining the deflection currents in the deflection yoke of a display system during the time the currents are changed to new values.

A further object of this invention is to provide a corrected step current deflection circuit which prevents beam skew when the deflection currents are switched.

The invention contemplates a deflection circuit for use with graphic display systems employing cathode ray tubes having electromagnetic deflection windings comprising, switch means for selectively connecting at least one of said windings, in response to control signals, to a plurality of current sources each of which supplies a different magnitude of current, and means momentarily operative under control of said signals for accepting and supplying current, as required to substantially maintain the existing current in the connected windings during the time required by said switch means to assume a new state in response to said control signals.

The foregoing and other objects, features and advantages of the invention will be apparent from the following more particular description of a preferred embodiment of the invention as illustrated in the accompanying drawing.

The single figure is a schematic diagram of a novel deflection circuit constructed in accordance with the invention.

The invention is illustrated with a push pull deflection system in which the X deflection is obtained by applying step currents of opposite polarity to the X and $\overline{X}$ windings illustrated. The push pull currents are controlled by a binary register 11 which has $n$ bipolar outputs, $(1, \overline{1})$ through $(n, \overline{n})$, inclusive. The binary quantity inserted in register 11 represents in binary form the X coordinate of the position to which the beam is to be deflected. This quantity is utilized to switch binarily weighted current sources $I_1$ through $I_n$; respectively to cause the currents in windings X and $\overline{X}$ to increase and decrease, respectively by a magnitude which will cause the appropriate beam deflection in the X direction.

Each bipolar output controls two transistor switches S and $\overline{S}$. If a register position stores a "zero" the bipolar output will close the $\overline{S}$ switch and open the S switch. If on the other hand, the position stores a "one" the S switch will be closed and the $\overline{S}$ open. The switches associated with the first position switch a current source $I_1$ while the switches associated with the second position switch a current source $I_2$. Positions three through $n$ switch current sources $I_3$ through $I_n$, respectively. Current sources $I_1$ through $I_n$ are, as previously stated, binarily weighted, thus, as the value of register 11 changes the currents through windings X and $\overline{X}$ will change by steps in a complementary fashion under the control of register 11 and switches S and $\overline{S}$. All of the S switches are connected to the X winding by a grounded base transistor amplifier 12 which sums the switch currents and provides proper impedance matching while the $\overline{S}$ switches are similarly connected to $\overline{X}$ winding by another grounded base transistor amplifier 14.

The circuit thus far described would prove adequate but for beam skew. The magnitude of the currents switched by switches S and $\overline{S}$ are binarily weighted according to position and the switches require different switching times, therefore, the currents supplied to windings X and $\overline{X}$ during the transient period do not reflect the new value in the register 11 and the resultant beam movement during the transient period is undesirable and therefore referred to as beam skew.

Beam skew can be eliminated by maintaining the last attained current condition in windings X and $\overline{X}$ until switching is completed and then returning current control to the switches. This solution is implemented by providing two additional current paths which are enabled during the switching or transient period and are automatically selected by the then prevailing conditions.

Winding X is connected to the common junction of two series aiding diodes D1 and D2. The anode of diode D1 is connected by a PNP transistor switch 16 to voltage source V1 and the cathode of diode D2 is connected by an NPN transistor switch 18 to source V2 which is the direct current potential applied to the common junction of windings X and $\overline{X}$. Winding $\overline{X}$ is connected to the common junction of series aiding diodes D3 and D4 and to source V1 and V2 via diodes D3 and D4 and switches 16 and 18, respectively.

With this arrangement, an increase in the current supplied to winding X will shunt the winding via diode D1 and switch 16 since the increase in the current through switch S will cause a drop in voltage at point P1 to forward bias diode D1. The corresponding decrease in current to winding $\overline{X}$ will be made up by current drawn from source V2 via switch 16 and diode D4 since the decrease in current through the switches $\overline{S}$ will cause an increase in the voltage at point P2 to forward bias diode D4. If the current through switch S decreases diode D2 performs the same function for winding X as diode D4 performed for winding $\overline{X}$ above and diode D3 performs the same function for winding $\overline{X}$ as diode D1 performed above for winding X. Sources V1 and V2 are both positive and except for the drops across the diodes limit the voltage swings of points P1 and P2 below and above, respectively, a nominal value which is approximately midway between the two under steady state current conditions.

Switches 16 and 18 are turned on just before switching takes place and turned off a fixed time later which provides sufficient time for the switches S and $\bar{S}$ to settle to their new value. For this purpose a negative going pulse is applied to the base of transistor switch 16 via an input terminal 20 and a positive going pulse is applied to the base of transistor switch 18 via a terminal 22.

The Y direction deflection circuits are identical to the X direction deflection circuits described above and bear the same reference numerals primed for the same parts described above in connection with the description of the X direction deflection circuits. The switches S have, however, been represented as a single block to simplify illustration. Switches 16 and 18 need not be duplicated and are common to both X and Y direction deflection circuits. The S switches due to the current polarities utilized are identical to switch 18 and utilize NPN transistors for the switch element.

While the invention has been particularly shown and described with reference to a preferred embodiment thereof, it will be understood by those skilled in the art that various changes in form and detail may be made therein without departing from the spirit and scope of the invention.

What is claimed is:

1. A deflection circuit for use with graphic display systems employing cathode ray tubes having electromagnetic deflection windings comprising, switch means connected to at least one of said windings for selectively connecting said connected windings in response to control signals to a plurality of current sources each of which supplies a different magnitude of current to said connected windings for causing beam deflection, and means momentarily operative under control of said control signals and connected to said windings and switch means for accepting and supplying current as required to substantially maintain the existing current in the connected windings during the time required by said switch means to assume a new state in response to said control signals.

2. A deflection circuit as set forth in claim 1 in which said momentarily operative means comprise, first means including a first unidirectional current conducting means momentarily connected to shunt said windings and supply current as required by the transient state of said switch means, and second means including a second unidirectional current conductor momentarily connected in series with said windings to accept current from said windings as required by the transient state of said switch means.

3. A deflection circuit for use with graphic display systems employing cathode ray tubes having push pull electromagnetic deflection windings comprising, first switch means connected to the (X) direction winding for selectively connecting each half of that winding, in response to control signals, to a plurality of current sources each of which supplies a different magnitude of current, second switch means connected to the (Y) direction winding for selectively connecting each half of that winding, in response to said control signals, to said current sources, and means momentarily operative under control of said control signals and connected to said windings and first and second switch means for accepting and supplying current as required to substantially maintain the existing currents in the windings during the time required by said first and second switch means to assume a new state in response to said control signals.

4. A deflection circuit as set forth in claim 3 in which said momentarily operative means comprises, first means including a plurality of unidirectional current conducting means each momentarily connected to shunt a different winding half and supply current to said first and second switch means as required by the transient state of the first and second switch means connected thereto, and second means including a plurality of unidirectional current conducting means, each momentarily connected in series with a different winding half to accept current from said winding as required by the transient state of the switch means connected thereto.

References Cited

UNITED STATES PATENTS 2,907,899 10/1959 Kabell et al.

RODNEY D. BENNETT, *Primary Examiner.*

T. H. TUBBESING, *Assistant Examiner.*